(12) United States Patent
Hayashi et al.

(10) Patent No.: US 9,716,412 B2
(45) Date of Patent: Jul. 25, 2017

(54) ROTOR FOR ROTATING ELECTRIC MOTOR, AND ROTOR MANUFACTURING METHOD

(71) Applicant: TOYOTA JIDOSHA KABUSHIKI KAISHA, Toyota-shi (JP)

(72) Inventors: Hirohito Hayashi, Kariya (JP); Takahiro Shiina, Numazu (JP); Masahide Uemura, Susono (JP); Akira Murakami, Gotemba (JP); Tomoyuki Tohyama, Chita (JP); Eiji Tsuchiya, Nisshin (JP); Yasumitsu Osada, Toyota (JP); Wataru Hijikata, Nagoya (JP); Takao Watanabe, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 180 days.

(21) Appl. No.: 14/762,049

(22) PCT Filed: Jan. 21, 2014

(86) PCT No.: PCT/JP2014/051091
§ 371 (c)(1),
(2) Date: Jul. 20, 2015

(87) PCT Pub. No.: WO2014/119422
PCT Pub. Date: Aug. 7, 2014

(65) Prior Publication Data
US 2016/0079817 A1    Mar. 17, 2016

(30) Foreign Application Priority Data

Jan. 29, 2013 (JP) ................................. 2013-014649

(51) Int. Cl.
*H02K 1/28* (2006.01)
*H02K 1/27* (2006.01)
(Continued)

(52) U.S. Cl.
CPC ................. *H02K 1/28* (2013.01); *H02K 1/22* (2013.01); *H02K 1/27* (2013.01); *H02K 1/276* (2013.01);
(Continued)

(58) Field of Classification Search
CPC .......... H02K 15/02; H02K 15/03; H02K 1/22; H02K 1/27; H02K 1/276; H02K 1/28; H02K 1/30
(Continued)

(56) References Cited

U.S. PATENT DOCUMENTS 5,793,136 A * 8/1998 Redzic .................. H02K 16/02
310/112
6,114,784 A * 9/2000 Nakano .................... B60K 6/26
310/113
(Continued)

FOREIGN PATENT DOCUMENTS

CN         1317661 A     10/2001
JP      2000188854 A  *  7/2000
(Continued)

OTHER PUBLICATIONS

Combined Chinese Office Action and Search Report issued on Nov. 21, 2016 in Patent Application No. 201480006175.1.
International Search Report issued Apr. 28, 2014, in PCT/JP2014/051091, filed Jan. 21, 2014.

*Primary Examiner* — Alex W Mok
(74) *Attorney, Agent, or Firm* — Oblon, McClelland, Maier & Neustadt, L.L.P.

(57) ABSTRACT

This rotor for a rotating electric motor includes a hollow cylindrical rotor core with a plurality of laminated electromagnetic steel plates. The inner and outer circumferential surfaces of the rotor core each face a magnetic gap. The rotor core is interposed between a first rotating support member and a second rotating support member. A flange is formed on
(Continued)

a first end of a tubular pin protruding from a first hole of the first rotating support member. A tubular expansion part of the tubular pin plastically deforms due to fluid pressure so as to come into close contact with a through hole of the rotor core, the first hole of the first rotating support member, and a second hole of the second rotating support member.

5 Claims, 9 Drawing Sheets

(51) Int. Cl.
    *H02K 15/03*      (2006.01)
    *H02K 1/22*      (2006.01)
    *H02K 15/02*      (2006.01)
    *H02K 1/30*      (2006.01)

(52) U.S. Cl.
    CPC ............... *H02K 1/30* (2013.01); *H02K 15/02* (2013.01); *H02K 15/03* (2013.01)

(58) Field of Classification Search
    USPC ........................ 310/156.53, 216.129; 29/598
    See application file for complete search history.

(56) References Cited

U.S. PATENT DOCUMENTS

| | | | | |
|---|---|---|---|---|
| 6,624,545 | B1* | 9/2003 | Furuse | H02K 16/02 310/114 |
| 7,026,742 | B2* | 4/2006 | Miyake | H02K 1/148 310/114 |
| 7,138,742 | B2* | 11/2006 | Arimitsu | B60K 6/445 310/114 |
| 2008/0054751 | A1* | 3/2008 | Hoshino | H02K 15/022 310/216.114 |
| 2008/0067886 | A1* | 3/2008 | Rau | H02K 15/028 310/216.004 |
| 2008/0174200 | A1* | 7/2008 | Okamoto | H02K 15/02 310/216.018 |

FOREIGN PATENT DOCUMENTS

| | | | | |
|---|---|---|---|---|
| JP | 2001112221 A | * | 4/2001 | ............ H02K 16/02 |
| JP | 2005-102460 A | | 4/2005 | |
| JP | 2009-240013 A | | 10/2009 | |
| JP | 2009-261185 A | | 11/2009 | |

* cited by examiner

ROTOR FOR ROTATING ELECTRIC MOTOR, AND ROTOR MANUFACTURING METHOD

TECHNICAL FIELD

The present disclosure relates to a rotor for a rotating electrical machine, which includes a cylindrical hollow rotor core. The disclosure also relates to a method for manufacturing the rotor.

BACKGROUND ART

Patent Document 1 describes an example of a method for fastening two types of differently shaped electromagnetic steel plates together to configure a rotor core adapted to be fixed to a rotary shaft of a rotating electrical machine by laminating the electromagnetic steel plates. The electromagnetic steel plates are fixed in a laminated state using, for example, a flanged tubular member. Specifically, a tubular member having a basal end in which a flange has been formed in advance is inserted through a fastening through hole of the rotor core. A ball having a diameter greater than the diameter of the fastening through hole is passed through the tubular member, thus expanding the tubular member. The distal end of the tubular member is then swaged in correspondence with the outline of the rotor core. The rotor core is configured by an inner member and an outer member, and coaxiality must be ensured between the inner member and the outer member. This makes it necessary to improve accuracy of the axes of the inner and outer members. According to a certain known method for fixing electromagnetic steel plates configuring a hollow rotor, for example, bolt insertion holes are formed in the electromagnetic steel plates, which configure a hollow rotor core. The electromagnetic steel plates are then fastened together using bolts and nuts to ensure cylindricity using axial fastening force.

PRIOR ART DOCUMENTS

Patent Documents

Patent Document 1: Japanese Laid-Open Patent Publication No. 2005-102460

SUMMARY OF THE INVENTION

Problems that the Invention is to Solve

In a case of a hollow rotor core configured by laminating electromagnetic steel plates together, the hollow rotor core is fixed between a first rotation support member and a second rotation support member. When the electromagnetic steel plates are fastened together using bolts and nuts, insertion of the bolts through insertion holes may be hampered by low machining accuracy of the electromagnetic steel plates. That is, if positions of bolt insertion holes of electromagnetic steel plates are displaced with respect to one another, fastening cannot be carried out effectively by bolts and nuts.

Accordingly, it is an objective of the present disclosure to ensure tight contact between fastening members and inner peripheral surfaces of insertion holes, by means of which electromagnetic steel plates configuring a hollow rotor core are fastened together, even if the insertion holes of the electromagnetic steel plates are displaced with respect to one another.

Means for Solving the Problems

In accordance with one aspect of the present disclosure, a rotor for a rotating electrical machine is provided. The rotor includes a hollow and cylindrical rotor core, a first rotation support member, a second rotation support member, and a tubular pin with a closed end. The hollow and cylindrical rotor core has a plurality of laminated electromagnetic steel plates. An inner peripheral surface and an outer peripheral surface of the rotor core are each adapted to face a magnetic gap. The rotor core has an insertion hole. The first rotation support member has a first hole. The second rotation support member has a second hole. The first rotation support member and the second rotation support member are adapted to be located on opposite sides of the rotor core. The tubular pin is inserted in the insertion hole, the first hole, and the second hole, and has a first end projecting from the first hole, a flange formed at the first end, and an expansion portion that is plastically deformed by fluid pressure to tightly contact inner peripheral surfaces of the insertion hole, the first hole, and the second hole.

In the above-described mode, the hollow rotor core is configured by laminating the electromagnetic steel plates together. The rotor core is cylindrical and each of the inner and outer peripheral surfaces of the rotor core faces a magnetic gap. The rotor core has an insertion hole for a tubular pin with a closed end. The first rotation support member and the second rotation support member are located on opposite sides of the rotor core. A tubular pin is inserted in the insertion hole of the hollow rotor core, the first hole of the first rotation support member, and the second hole of the second rotation support member. The flange of the tubular pin is formed at the first end of the tubular pin, which projects from the first hole. The expansion portion of the tubular pin is plastically deformed by fluid pressure and thus caused to tightly contact the inner peripheral surfaces of the insertion hole, the first hole, and the second hole. As a result, even if the laminated electromagnetic steel plates have fastening insertion holes displaced from one another, the tubular pin with a closed end serving as a fastening member is caused to tightly contact the inner peripheral surfaces of the respective insertion holes.

According to one form of the disclosure, the tubular pin has a second end projecting from the second hole, and a large diameter portion is formed at the second end. As a result, the large diameter portion facilitates prevention of separation of the tubular pin from the rotor core.

According to one form of the disclosure, the rotor further includes a plurality of permanent magnet embedding holes. The insertion hole is one of a plurality of insertion holes. The insertion holes and the permanent magnet embedding holes are formed alternately in a circumferential direction of the rotor core.

In accordance with another aspect of the present disclosure, a method for manufacturing a rotor for a rotating electrical machine is provided. The rotor includes a cylindrical and hollow rotor core, a first rotation support member, and a second rotation support member. The cylindrical and hollow rotor core has a plurality of laminated electromagnetic steel plates. An inner peripheral surface and an outer peripheral surface of the rotor core are each adapted to face a magnetic gap, and the rotor core has an insertion hole. The first rotation support member has a first hole. The second rotation support member has a second hole. The first rotation support member and the second rotation support member are adapted to be located on opposite sides of the rotor core. The method includes: a first step for inserting a tubular pin with a closed end into the first hole, the insertion hole, and the second hole, wherein the tubular pin has a first end at which a flange is formed; and a second step for plastically deforming the tubular pin through fluid pressure pressing to enlarge the size of the tubular pin, thereby causing the tubular pin to tightly contact inner peripheral surfaces of the insertion hole, the first hole, and the second hole.

According to the above-described method, in the first step, the tubular pin having a closed end and a flange formed at the first end is inserted into the first hole of the first rotation support member, the insertion hole of the hollow rotor core, and the second hole of the second rotation support member. In the second step, the tubular pin is plastically deformed through fluid pressure pressing and thus expanded. This causes the tubular pin to tightly contact the inner peripheral surfaces of the insertion hole, the first hole, and the second hole. In this manner, the rotor for a rotating electrical machine according to claim 1 is manufactured.

In accordance with one form of the disclosure, the method further includes: in the first step, inserting the tubular pin into the first hole and the insertion hole such that the tubular pin projects from the second hole; and in the second step, increasing the diameter of the portion of the tubular pin projecting from the second hole.

MODES FOR CARRYING OUT THE INVENTION

A rotor for a rotating electric machine according to one embodiment of the present disclosure will now be described with reference to FIGS. 1 to 10.

Figure 3A:
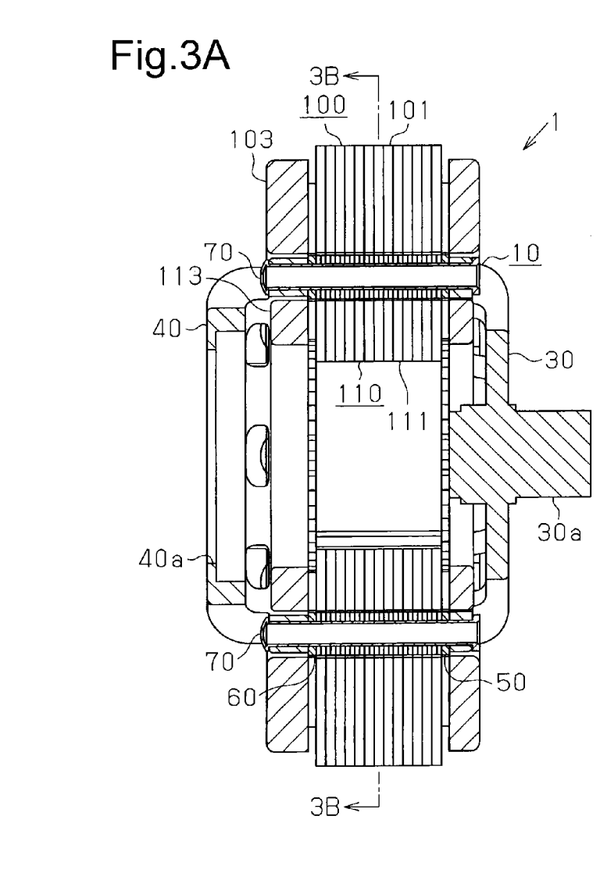
FIG. 3A is a longitudinal cross-sectional view showing a rotating electrical machine having a wound stator arranged outside the magnet rotor of FIG. 1 and a wound rotor arranged inside the magnet rotor of FIG. 1.
Figure 3B:
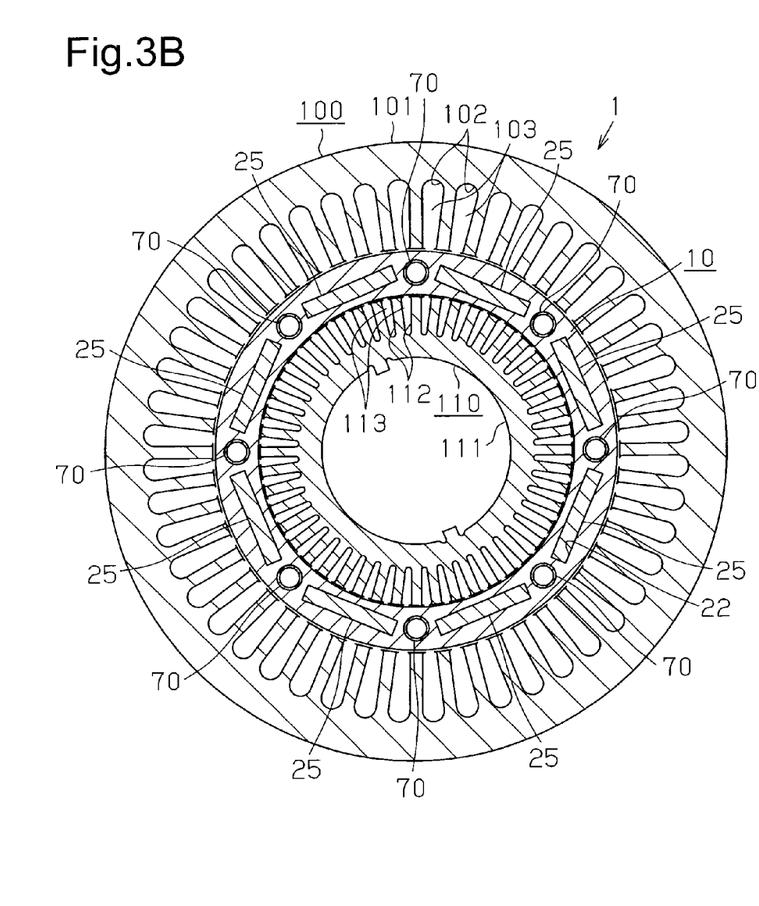
FIG. 3B is a cross-sectional view taken along line 3B-3B of FIG. 3A.

As illustrated in FIGS. 3A and 3B, a rotating electrical machine 1 includes a magnet rotor 10 serving as a rotor, a wound stator 100, and a wound rotor 110. The magnet rotor 10 is cylindrical, and the cylindrical wound stator 100 is arranged at an outer side of the magnet rotor 10 with a gap, which is a magnetic clearance, formed between the magnet rotor 10 and the wound stator 100. The cylindrical wound rotor 110 is arranged at an inner side of the magnet rotor 10 with another gap, which is another magnetic clearance, formed between the magnet rotor 10 and the wound rotor 110. The magnet rotor 10, the wound stator 100, and the wound rotor 110 are arranged coaxial with one another. The magnet rotor 10 is connected to one of an output shaft and an input shaft of a vehicle and the wound rotor 110 is connected to the other of the input shaft and the output shaft.

With reference to FIG. 3B, slots 102 are formed in a core 101 of the wound stator 100 and arranged in the circumferential direction. Each of the slots 102 has an opening in the inner peripheral surface of the cylindrical core 101. A coil 103 is inserted in each slot 102. Slots 112 are formed in the core 111 of the wound rotor 110 and arranged in the circumferential direction. Each of the slots 112 has an opening in the outer peripheral surface of the cylindrical core 111. A coil 113 is inserted in each slot 112.

Figure 1:
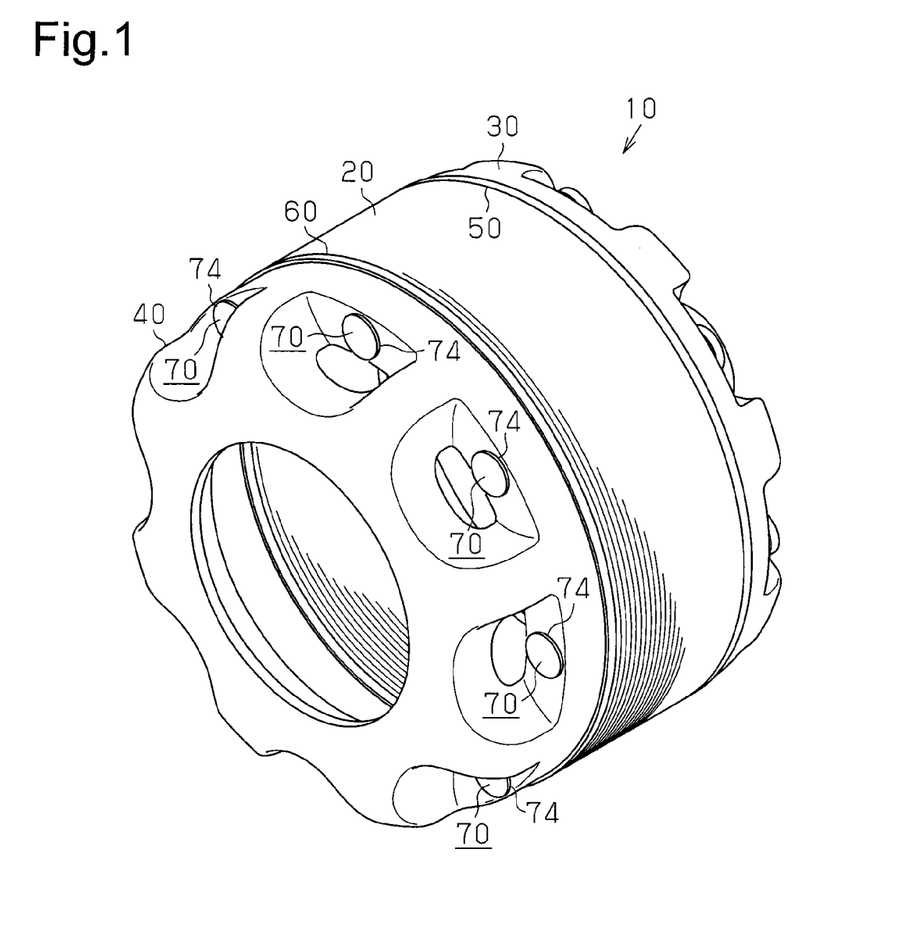
FIG. 1 is a perspective view showing a magnet rotor according to an embodiment of the present disclosure.
Figure 2:
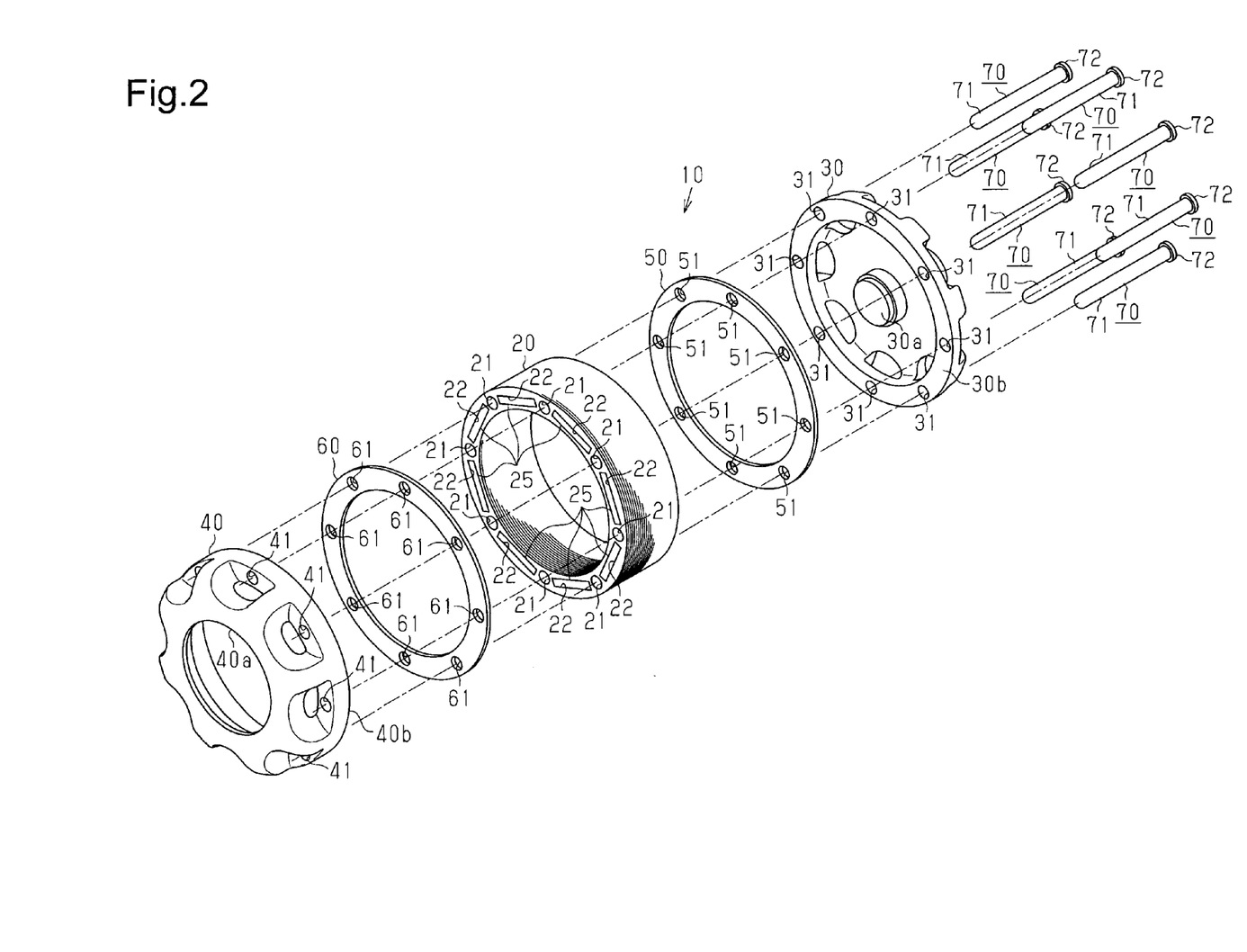
FIG. 2 is an exploded perspective view showing the magnet rotor illustrated in FIG. 1.
Figure 9A:
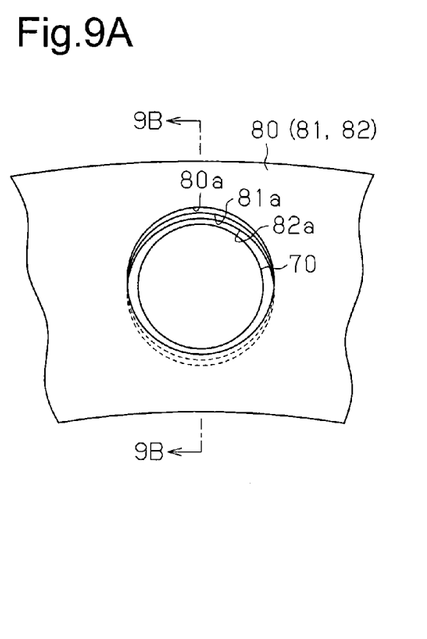
FIG. 9A is an explanatory front view of the tubular pin and insertion holes of laminated electromagnetic steel plates, illustrating the manufacturing step following FIG. 8.
Figure 9B:
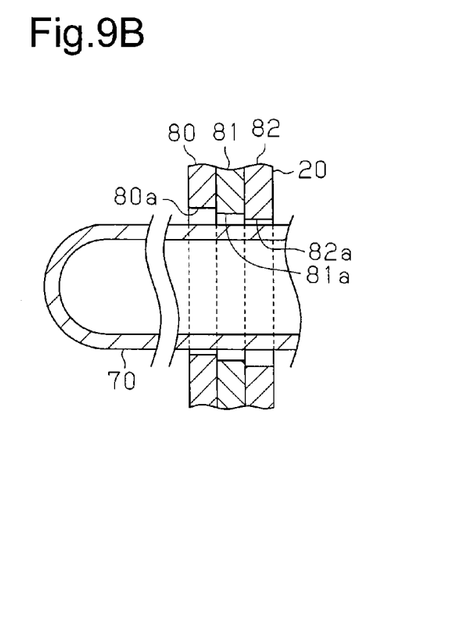
FIG. 9B is a cross-sectional view taken along line 9B-9B of FIG. 9A.

As illustrated in FIGS. 1 and 2, the magnet rotor 10 has a hollow rotor core 20 serving as a magnet rotor core, a first rotation support member 30, and a second rotation support member 40. The magnet rotor 10 also includes a first end plate 50, a second end plate 60, and a plurality of (specifically, eight) tubular pins 70 with a closed end. The hollow rotor core 20 is configured by laminating electromagnetic steel plates 80, 81, 82 (reference numerals 80, 81, 82 are shown in FIG. 9) together in the axial direction and has a cylindrical shape. The inner peripheral surface and the outer peripheral surface of the hollow rotor core 20 face the magnetic gaps and are referred to as gap surfaces. The hollow rotor core 20 has eight tubular pin insertion holes 21 and eight permanent magnet embedding holes 22. The insertion holes 21 and the permanent magnet embedding holes 22 extend axially through the hollow rotor core 20. The eight insertion holes 21 are formed at equal angles in the circumferential direction. The tubular pin insertion holes 21 and the permanent magnet embedding holes 22 are formed in the hollow rotor core 20 in a circumferentially alternating manner. Each of the permanent magnet embedding holes 22 has a rectangular cross section in a direction perpendicular to the axis of the hollow rotor core 20. A permanent magnet 25, which has a rectangular cross section, is fitted in each permanent magnet embedding hole 22. The magnet rotor 10 thus configures an interior permanent magnet rotor.

The first rotation support member 30 is shaped like a bowl and has a shaft portion 30a, which is formed at the center. A circumferential portion 30b, which defines an opening of the bowl-shaped first rotation support member 30, has eight first tubular pin holes 31. The second rotation support member 40 is shaped like a bowl. A central portion of the second rotation support member 40 has a through hole 40a. A circumferential portion 40b, which defines an opening of the bowl-shaped second rotation support member 40, has eight second tubular pin holes 41. The first rotation support member 30 and the second rotation support member 40 are located on opposite sides of the hollow rotor core 20 in the axial direction.

The first end plate 50 is shaped like a disk and has eight tubular pin insertion holes 51. The first end plate 50 is arranged between the first rotation support member 30 and the hollow rotor core 20. The second end plate 60 is shaped like a disk and has eight tubular pin insertion holes 61. The second end plate 60 is arranged between the second rotation support member 40 and the hollow rotor core 20.

Figure 4:
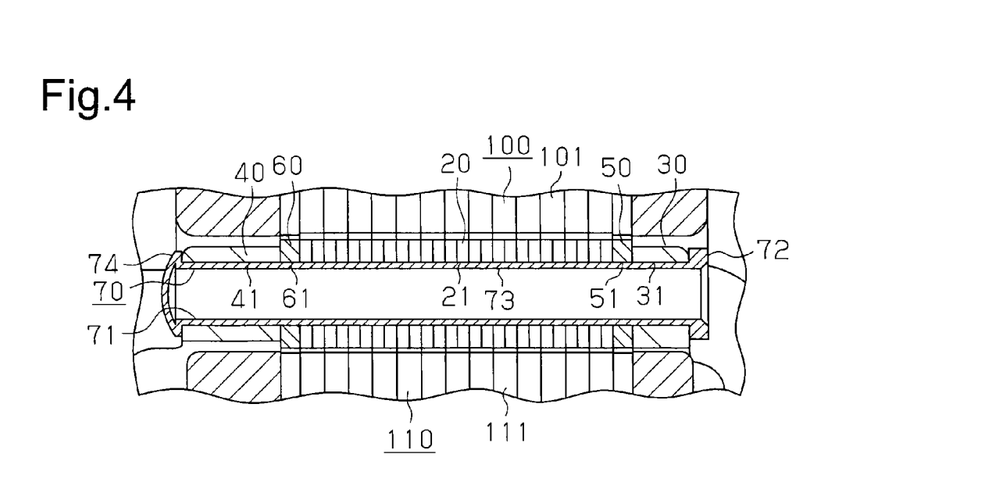
FIG. 4 is an enlarged cross-sectional view showing a tubular pin of the rotating electrical machine of FIG. 3A and the periphery of the tubular pin.

Each of the tubular pins 70 is formed of stainless steel (which is, for example, SUS 304). As shown in FIGS. 2 and 4, a pin body 71, which is the body of each tubular pin 70, is inserted in the corresponding first hole 31 of the first rotation support member 30, the corresponding insertion hole 51 of the first end plate 50, the corresponding insertion hole 21 of the hollow rotor core 20, the corresponding insertion hole 61 of the second end plate 60, and the corresponding second hole 41 of the second rotation support member 40. Each tubular pin 70 has a flange 72, an expansion portion 73, and a large diameter portion 74. The basal end of each pin body 71, which is a first end, is open and has a flange 72 having a diameter greater than the diameter of the pin body 71. That is, the flange 72 is formed at the first end of each pin body 71, which projects from the corresponding first hole 31 of the first rotation support member 30. The distal end of each pin body 71, which is a second end, is closed such that the tubular pin 70 has a closed end, or, in other words, is shaped like a bag.

The expansion portions 73 are plastically deformed by fluid pressure and thus caused to tightly contact the inner peripheral surfaces of the insertion holes 21 of the hollow rotor core 20, the first holes 31 of the first rotation support member 30, and the second holes 41 of the second rotation support member 40. Using the tubular pins 70 each maintained in this state, the hollow rotor core 20, the first rotation support member 30, and the second rotation support member 40 are joined together. Each of the large diameter portions 74, which has a diameter greater than the diameter of each pin body 71, is formed at the second end of the associated one of the pin bodies 71. That is, each large diameter portion 74 is formed at the second end of the associated tubular pin 70, which projects from the corresponding second hole 41 of the second rotation support member 40, and has a flange-like shape. The electromagnetic steel plates 80, 81, 82, which configure the hollow rotor core 20, are fastened together in the axial direction by means of the tubular pins 70.

Figure 5:
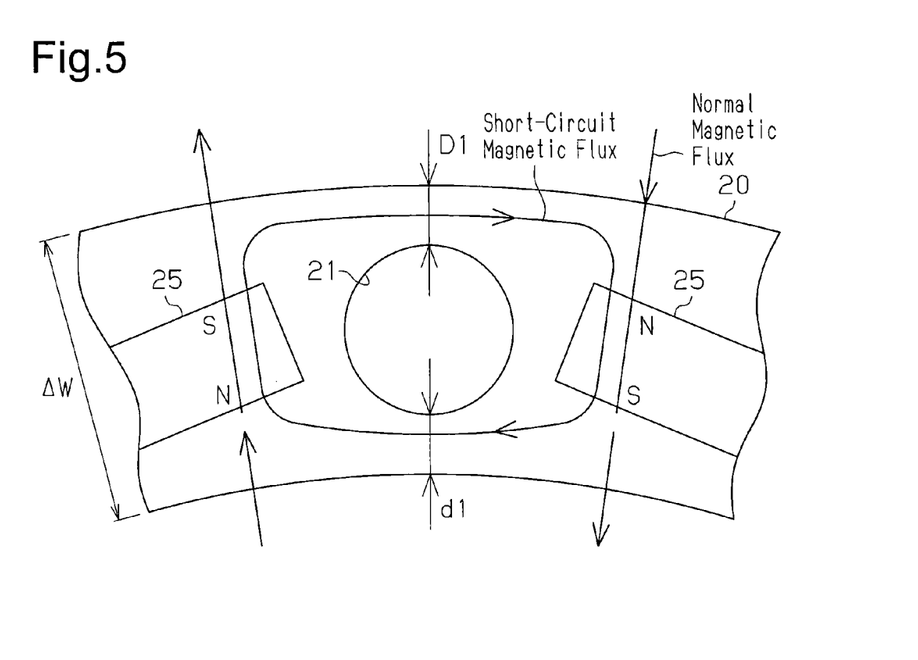
FIG. 5 is an enlarged front view showing an insertion hole of FIG. 4 and the periphery of the insertion hole.
Figure 11A:
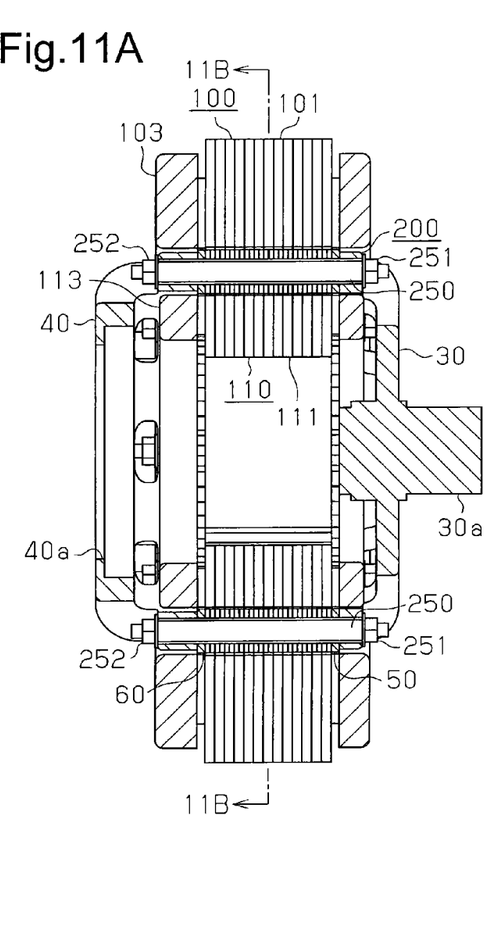
FIG. 11A is a longitudinal cross-sectional view showing a rotating electrical machine as a comparative example.
Figure 11B:
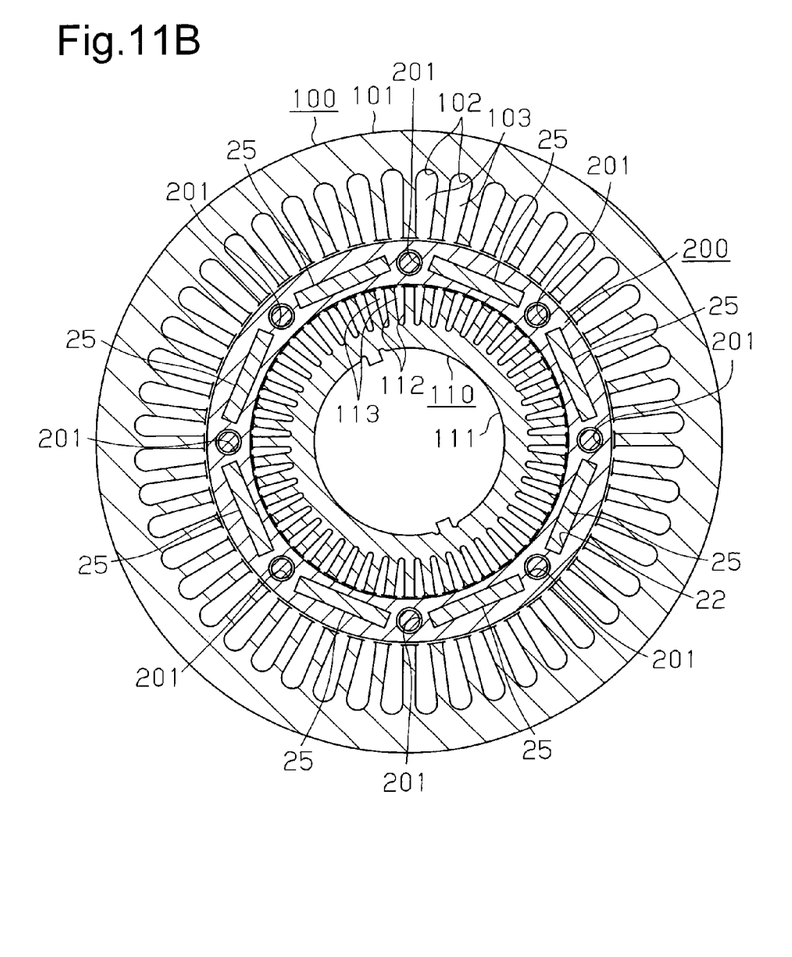
FIG. 11B is a cross-sectional view taken along line 11B-11B of FIG. 11A.
Figure 12:
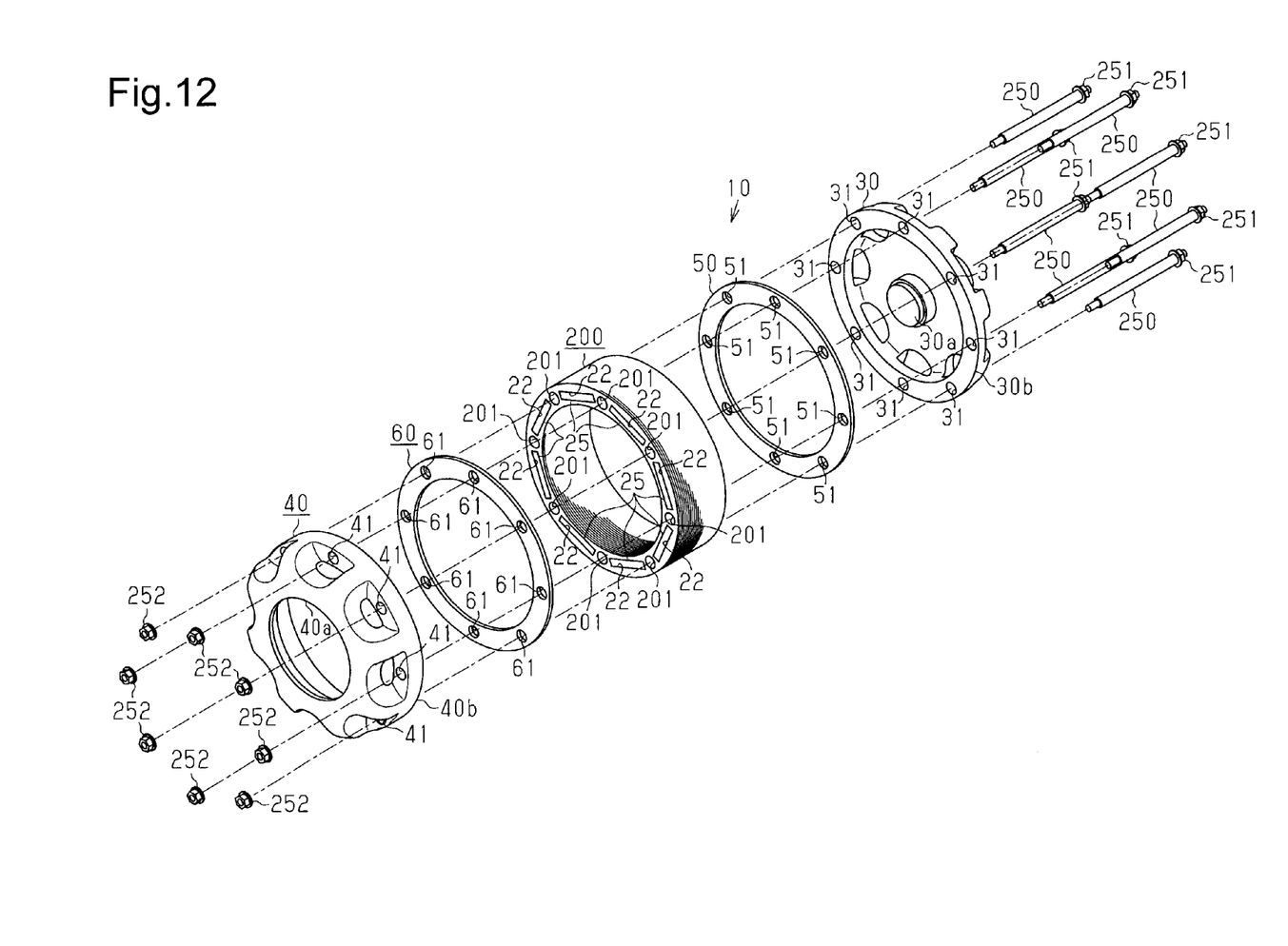
FIG. 12 is an exploded perspective view showing the magnet rotor illustrated in FIG. 11A.

FIG. 5 illustrates an inner bridge width d1 and an outer bridge width D1 of the hollow rotor core 20. The inner bridge width d1 is the radial dimension of the portion of the hollow rotor core 20 between each insertion hole 21, through which the corresponding tubular pin 70 passes, and the inner peripheral surface of the hollow rotor core 20. The outer bridge width D1 is the radial dimension of the portion of the hollow rotor core 20 between each insertion hole 21, through which the corresponding tubular pin 70 passes, and the outer peripheral surface of the hollow rotor core 20. Each of the bridge widths d1, D1 is small compared to the bridge width illustrated in FIGS. 11 and 12 showing a comparative example, which will be described below, or, in other words, the bridge width of the rotor core of the comparative example having a structure in which the electromagnetic steel plates 80, 81, 82 are fastened together using bolts and nuts.

Operation of the magnet rotor 10, which is rotor for a rotating electrical machine, will now be described.

Figure 6A:
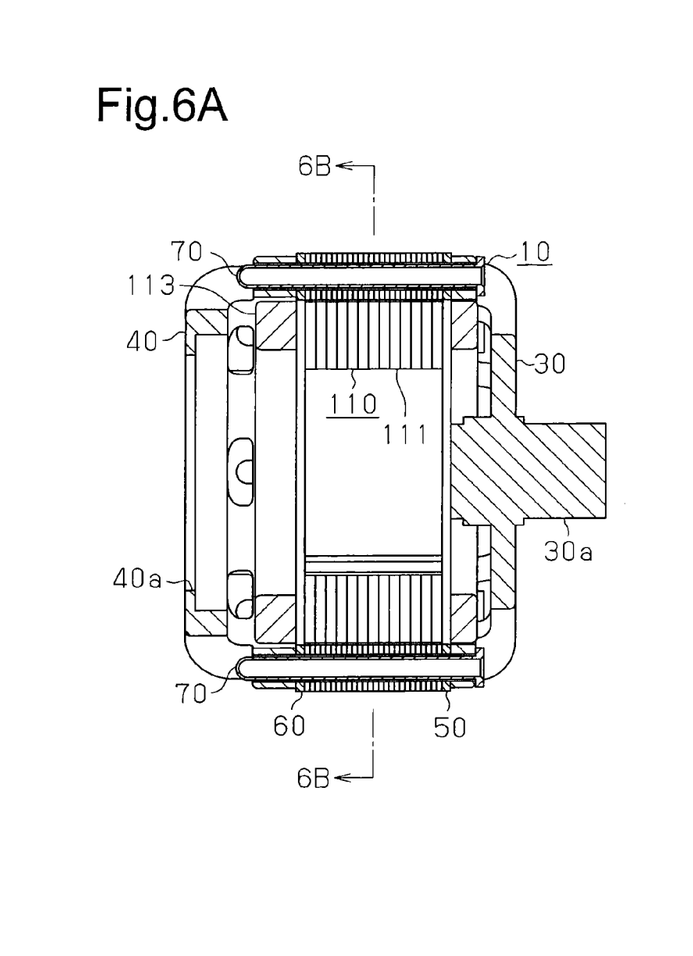
FIG. 6A is an explanatory longitudinal cross-sectional view of the magnet rotor and the wound rotor, illustrating a step for manufacturing the rotating electrical machine of FIG. 3A.
Figure 6B:
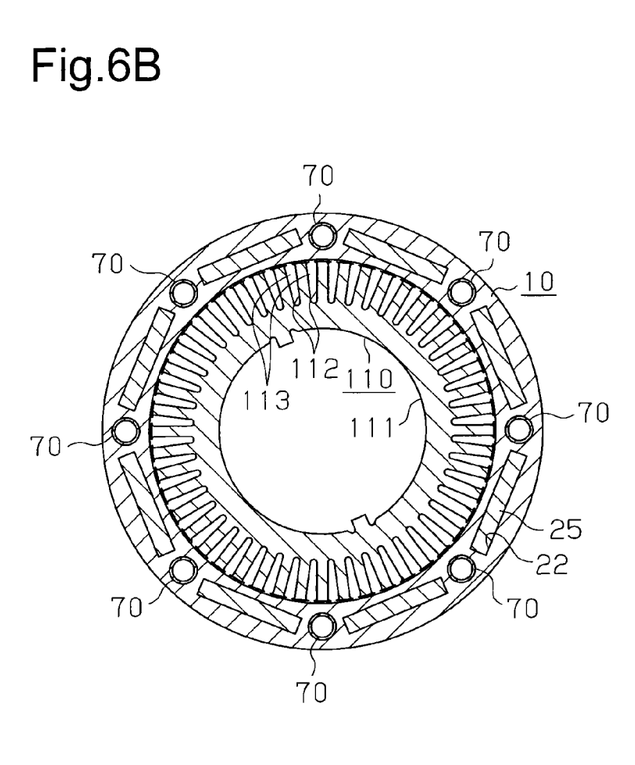
FIG. 6B is a cross-sectional view taken along line 6B-6B of FIG. 6A.
Figure 7:
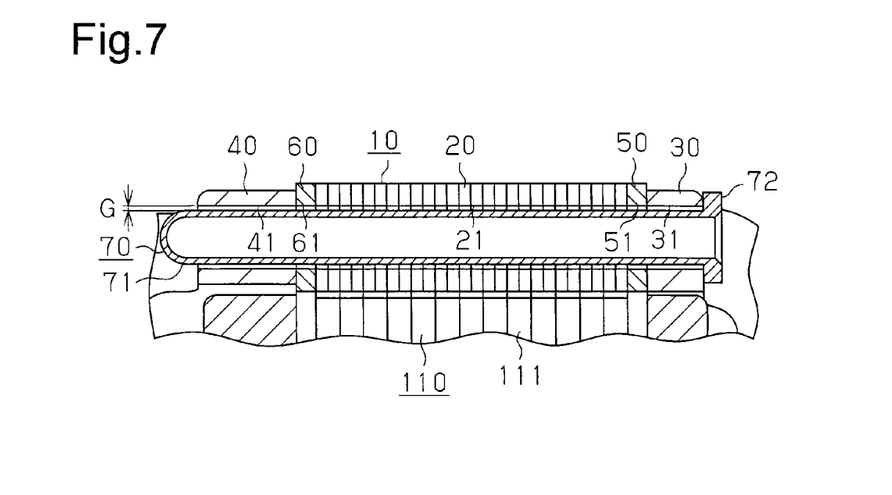
FIG. 7 is an explanatory enlarged cross-sectional view of the tubular pin and the periphery of the tubular pin, illustrating the manufacturing step following FIG. 6A.

In a step for manufacturing the rotating electrical machine 1, the wound rotor 110 and the components of the magnet rotor 10 that are not yet assembled together are prepared. As illustrated in FIGS. 6 and 7, the wound rotor 110 is passed through the magnet rotor 10. At this stage, the position of the first rotation support member 30 and the position of the second rotation support member 40 of the magnet rotor 10 are set using a jig (a metal die). In this state, the tubular pins 70, each of which has the flange 72 formed at the first end, are inserted into the first holes 31 of the first rotation support member 30, the insertion holes 51 of the first end plate 50, the insertion holes 21 of the hollow rotor core 20, the insertion holes 61 of the second end plate 60, and the second holes 41 of the second rotation support member 40. That is, the flanged tubular pins 70 are used. The first end of each tubular pin 70 has a flange-like shape and each of the flanges 72 is held in surface contact with the portion of the first rotation support member 30 around the opening of the corresponding one of the first holes 31 of the first rotation support member 30. In a pin inserted state and prior to fluid pressure pressing, as illustrated in FIG. 7, a gap G is formed between the outer peripheral surface of the pin body 71 of each tubular pin 70 and the inner peripheral surfaces of the corresponding holes 31, 51, 21, 61, 41. The tubular pin 70 projects axially from the second hole 41 of the second rotation support member 40.

Figure 8:
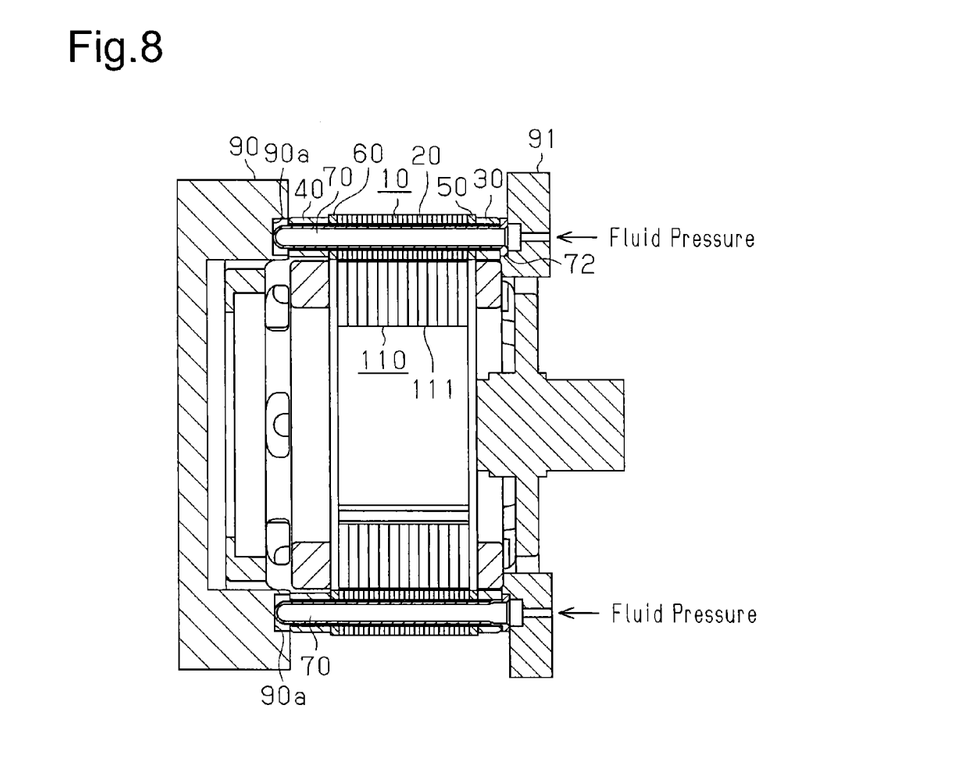
FIG. 8 is an explanatory cross-sectional view of the magnet rotor and the wound rotor both attached to a jig, illustrating a manufacturing step following FIG. 7.

Then, fluid pressure pressing is performed as illustrated in FIG. 8. That is, pressure of fluid, such as water or oil, is applied into each tubular pin 70 from the first end, or, in other words, the open end, of the tubular pin 70 at which the flange 72 is arranged. In this manner, the tubular pin 70 is subjected to the fluid pressure pressing. The tubular pin 70 is thus plastically deformed from inside and expanded. That is, both the inner diameter and the outer diameter of the tubular pin 70 are increased. As a result, the outer peripheral surface of each tubular pin 70 comes into tight contact with the inner peripheral surfaces of the corresponding first hole 31 of the first rotation support member 30, the corresponding insertion hole 21 of the hollow rotor core 20, and the corresponding second hole 41 of the second rotation support member 40.

More specifically, with the tubular pins 70 inserted, the magnet rotor 10 and the tubular pins 70 are located on the opposite axial ends using metal dies 90, 91, as illustrated in FIG. 8. In this state, fluid pressure is applied into the tubular pins 70, thus allowing expansion of the tubular pins 70. It is desirable to enlarge the sizes of the eight tubular pins 70 simultaneously at this time.

Figure 10A:
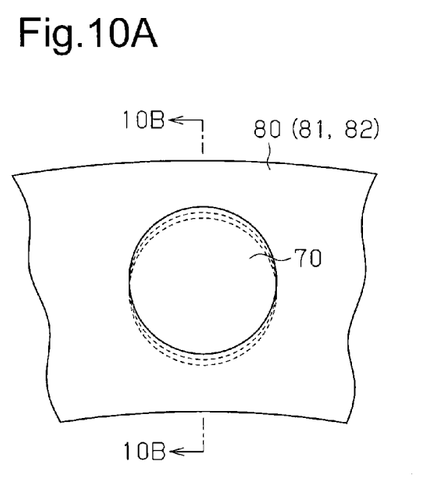
FIG. 10A is an explanatory front view of the tubular pin and the insertion holes of the laminated electromagnetic steel plates, illustrating the manufacturing step following FIG. 9A.
Figure 10B:
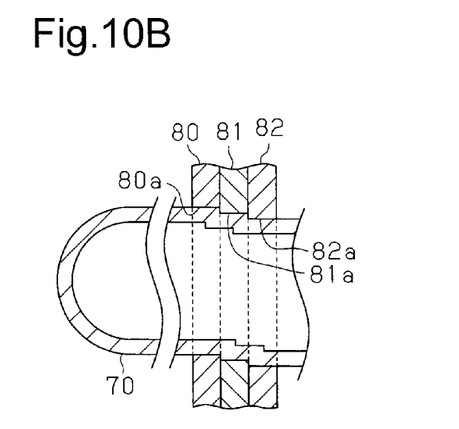
FIG. 10B is a cross-sectional view taken along line 10B-10B of FIG. 10A.

FIGS. 9 and 10 illustrate the fluid pressure pressing of the tubular pins 70. Referring to FIG. 9, the electromagnetic steel plates 80, 81, 82, which are laminated together, have insertion holes 80a, 81a, 82a, respectively. Assume that, at this stage, the positions of the insertion holes 80a, 81a, 82a are displaced with respect to one another. In this case, the inner peripheral surfaces of the insertion holes 80a, 81a, 82a of the electromagnetic steel plates 80, 81, 82 include portions held in contact with the corresponding tubular pin 70 and portions separate from the tubular pin 70. However, with reference to FIG. 10, by expanding the tubular pin 70 through the fluid pressure pressing, the tubular pin 70 is brought into tight contact with the entire portions of the inner peripheral surfaces of the holes 80a, 81a, 82a.

Therefore, even if the fastening insertion holes 80a, 81a, 82a of the electromagnetic steel plates 80, 81, 82 are displaced with respect to one another in the hollow rotor core 20, which is configured by laminating the electromagnetic steel plates 80, 81, 82 together, the tubular pins 70 each serving as a fastening member are caused to tightly contact the walls of the insertion holes 80a, 81a, 82a of all electromagnetic steel plates 80, 81, 82.

Through the above-described expansion, the hollow rotor core 20, the first rotation support member 30, and the second rotation support member 40 are joined together by means of the tubular pins 70. This ensures coaxiality of the inner and outer diameters between the rotation support members 30, 40, which are arranged on the opposite axial sides of the hollow rotor core 20, and the hollow rotor core 20. That is, the core of the wound rotor 110 coincides with the core of the hollow rotor core 20. Also, the core of the wound stator 100 (see FIG. 3) coincides with the core of the hollow rotor core 20.

When the tubular pins 70 are expanded, the second ends of the tubular pins 70, which project from the second rotation support member 40, are formed simultaneously. That is, the distal ends, which are the second ends, of the tubular pins 70 are deformed each in a flange-like shape. In this manner, each of the second ends is shaped to have the large diameter portion 74, as illustrated in FIG. 4. That is, at the time of expansion of each tubular pin 70, the second end, which is the portion of the tubular pin 70 projecting from the corresponding second hole 41 of the second rotation support member 40, is shaped in correspondence with the shape of the pressing die. In other words, the second ends of the tubular pins 70 are pressed axially against corresponding contact portions 90a of the metal die 90, referring to FIG. 8, and thus expanded radially such that each of the second ends is shaped like a flange. In this manner, the second ends of the tubular pins 70 are pressed by the metal die 90 to form the large diameter portions 74, which stop the tubular pins 70.

As a result, assembly of the magnet rotor 10, which is illustrated in FIG. 1, is completed. Afterwards, the wound stator 100 is assembled with the wound rotor 110 and the magnet rotor 10.

Through the above-described expansion of the tubular pins 70 employing fluid pressure pressing, a tight fit state of the hollow rotor core 20 and the tubular pins 70 is brought about. This ensures improved cylindricality, which is improved assembly accuracy, of the hollow rotor core 20. Rotation torque of the magnet rotor 10 is thus received by all of the tubular pins 70.

FIGS. 11 and 12 illustrate a hollow rotor core 200 of a comparative example, which has a configuration of a case in which electromagnetic steel plates are fastened together using bolts 250 and nuts 251, 252. Bolt insertion holes 201 are formed in the hollow rotor core 200. The bolts 250 are inserted in the corresponding bolt insertion holes 201 and fastened from opposite axial sides using the nuts 251, 252. To ensure necessary rotation strength of the hollow rotor core 200 of this comparative example, the bridge width corresponding to the bridge widths d1, D1 of FIG. 5 must be maintained at a great value.

That is, if all of the employed bolts are reamer bolts in a case of a hollow rotor core 200 exhibiting low machining accuracy, it may be impossible to insert the bolts 250 into the bolt insertion holes 201 of the hollow rotor core 200 to perform positioning for rotor assembly. To solve this problem, reamer bolts are used as only two of the eight bolts 250 of the hollow rotor core 20 that are arranged on a diagonal line to ensure the aforementioned positioning. The configuration of the hollow rotor core 200 of the comparative example thus needs a great number of fastening components, thus increasing the number of assembly steps and raising costs. To ensure necessary seat surfaces in the nuts 251, 252, the difference between the inner and outer diameters of the hollow rotor core 200, or, in other words, the radial dimension (the thickness) of the hollow rotor core 200, must be increased or, alternatively, the thread size of each of the nuts 251, 252 must be decreased. Generally, it is desirable that the portion between each bolt insertion hole 201 and the inner or outer peripheral surface of the hollow rotor core 200, which is the bridge portion, have a small width, or, in other words, a small bridge width, to improve magnetic characteristics of the motor. However, to ensure the aforementioned necessary seat surfaces, the hollow rotor core 200 of the comparative example must have a great bridge width.

In contrast, in the above illustrated embodiment, a fastening member is configured by a single component, which is the tubular pin 70, instead of three components, which are the bolt 250 and the nuts 251, 252 of the comparative example. This enables cost saving. The diameters of the flange 72 and the diameter of the large diameter portion 74 of each tubular pin 70 of the present embodiment may be each set to a minimum value needed and thus be small compared to the diameter of the seat surface of each of the nuts 251, 252 of the comparative example. This also decreases the radial width of the hollow rotor core 20, which is the difference ΔW between the inner and outer diameters of the hollow rotor core 20 shown in FIG. 5. As a result, the size of the hollow rotor core 20 is reduced in a radial direction. Tight fitting of the electromagnetic steel plates 80, 81, 82 through expansion of the tubular pins 70 eliminates rattling of the magnet rotor 10. This enables accurate positioning of the electromagnetic steel plates 80, 81, 82 relative to one another.

The expansion of the tubular pins 70 causes residual stress in the hollow rotor core 20, which is configured by laminating the electromagnetic steel plates 80, 81, 82 together. This increases magnetic resistance of the hollow rotor core 20, thus bringing about the same magnetic effect as the magnetic effect obtained by decreasing the bridge widths of the hollow rotor core 20. In other words, by forming each tubular pin 70 in accordance with an expansion structure to improve the magnetic characteristics of the motor, which is the rotating electrical machine 1, the residual stress is caused in the electromagnetic steel plates 80, 81, 82. This increases the magnetic resistance of the hollow rotor core 20, thus ensuring necessary motor characteristics.

The present embodiment will now be compared to a case in which, for example, the electromagnetic steel plates 80, 81, 82 are free of residual stress and that the bridge widths d1, D1 shown in FIG. 5 are both 2 mm. In the present embodiment, by causing residual stress in the electromagnetic steel plates 80, 81, 82, a substantial bridge width, which is the width of a path through which a short-circuit magnetic flux passes, is set to 0.5 mm. That is, the embodiment uses deterioration of magnetic characteristics of the electromagnetic steel plates 80, 81, 82 caused by the residual stress, which is produced through tight fitting of the electromagnetic steel plates 80, 81, 82 accomplished by expanding each tubular pin 70. In other words, a range of each electromagnetic steel plate 80, 81, 82 that does not function as a portion through which the magnetic flux passes has a residual stress width of 1.5 mm, even if the actually measured bridge width is 2 mm. As a result, the range that functions for motor performance is only the portion corresponding to 0.5 mm of the actually measured bridge width 2 mm of each electromagnetic steel plate 80, 81, 82. This enables a bridge width that cannot be obtained through simple manufacture, thus hampering passing of a short-circuit magnetic flux.

The above illustrated embodiment has the following advantages.

(1) To configure the magnet rotor 10 serving as the rotor for a rotating electrical machine, the tubular pins 70 with a closed end are inserted in the insertion holes 21 of the hollow rotor core 20, the first holes 31 of the first rotation support member 30, and the second holes 41 of the second rotation support member 40. The flange 72 of each tubular pin 70 is formed at the first end of the tubular pin 70, which projects from the corresponding first hole 31. The expansion portion 73 of each tubular pin 70 is plastically deformed by fluid pressure and thus caused to tightly contact the inner peripheral surfaces of the corresponding insertion hole 21, first hole 31, and second holes 41. Therefore, even if the insertion holes 21 of the electromagnetic steel plates 80, 81, 82 are displaced with respect to one another in the hollow rotor core 20, which is configured by laminating the electromagnetic steel plates 80, 81, 82 together, the tubular pins 70 each serving as a fastening member are brought into tight contact with the inner peripheral surfaces of the corresponding insertion holes 21. The electromagnetic steel plates 80, 81, 82 of the hollow rotor core 20 employ a fastening structure without a bolt or a nut, thus reducing the radial size of the hollow rotor core 20.

(2) Residual stress is caused in the hollow rotor core 20, which is the laminated body of the electromagnetic steel plates 80, 81, 82, by expanding each tubular pin 70. This decreases a substantial bridge width of a magnetic circuit. That is, the width of a path through which a short-circuit magnetic flux passes is decreased. The hollow rotor core 20 is thus configured to hamper passing of the short-circuit magnetic flux.

(3) The large diameter portion 74 is formed at the second end of each tubular pin 70, which projects from the corresponding second hole 41 of the second rotation support member 40. This facilitates prevention of separation of the tubular pins 70 from the hollow rotor core 20.

(4) A method for manufacturing the magnet rotor 10, which is the rotor for a rotating electrical machine, includes a first step and a second step. In the first step, each tubular pin 70, which has the flange 72 formed at the first end, is inserted into the corresponding first hole 31 of the first rotation support member 30, the corresponding insertion hole 21 of the hollow rotor core 20, and the corresponding second hole 41 of the second rotation support member 40. In the second step, the tubular pins 70 are plastically deformed through fluid pressure pressing and thus expanded. Each tubular pin 70 is thus brought into tight contact with the inner peripheral surfaces of the corresponding insertion hole 21, first hole 31, and second hole 41. In this manner, the magnet rotor 10 for a rotating electrical machine described in the above-described item (1) is manufactured.

(5) In the first step, the tubular pins 70 project from the corresponding second holes 41. In the second step, the portions of the tubular pins 70 projecting from the second holes 41 are enlarged in diameter. As a result, the portion of each tubular pin 70 having the increased diameter, which is the large diameter portion 74, functions as a stopper of the tubular pin 70 with respect to the hollow rotor core 20.

The above illustrated embodiment may be modified as follows.

Each tubular pin 70 may be expanded to tightly contact at least a portion of the walls of the corresponding second hole 41 of the second rotation support member 40.

The magnet rotor 10 is not restricted to the configuration in which the wound rotor 110 is arranged inside the magnet rotor 10. The magnet rotor 10 may have an outer rotor structure in which a stator is arranged inside the magnet rotor 10.

In each electromagnetic steel plate 80, 81, 82 of the hollow rotor core, a range in which residual stress is caused through expansion of each tubular pin 70 may be set as needed.

DESCRIPTION OF THE REFERENCE NUMERALS

10 . . . magnet rotor, 20 . . . hollow rotor core, 21 . . . insertion hole, 22 . . . permanent magnet embedding hole, 30 . . . first rotation support member, 31 . . . first hole, 40 . . . second rotation support member, 41 . . . second hole, 70 . . . tubular pin with closed end, 72 . . . flange, 73 . . . expansion portion, 74 . . . large diameter portion.

The invention claimed is:

1. A rotor for a rotating electrical machine, the rotor comprising:
    a hollow and cylindrical rotor core having a plurality of laminated electromagnetic steel plates, wherein an inner peripheral surface and an outer peripheral surface of the rotor core are each adapted to face a magnetic gap, and the rotor core has an insertion hole;
    a first rotation support member having a first hole;
    a second rotation support member having a second hole, wherein the first rotation support member and the second rotation support member are adapted to be located on opposite sides of the rotor core; and
    a tubular pin with a closed end, wherein the tubular pin is inserted in the insertion hole, the first hole, and the second hole, and has a first end projecting from the first hole, a flange formed at the first end, and an expansion portion that is plastically deformed by fluid pressure to tightly contact inner peripheral surfaces of the insertion hole, the first hole, and the second hole.

2. The rotor for a rotating electrical machine according to claim 1, wherein
    the tubular pin has a second end projecting from the second hole, and
    a large diameter portion having an outer diameter greater than an outer diameter of the expansion portion is formed at the second end.

3. The rotor for a rotating electrical machine according to claim 1, further comprising a plurality of permanent magnet embedding holes, wherein
    the insertion hole is one of a plurality of insertion holes, and
    the insertion holes and the permanent magnet embedding holes are formed alternately in a circumferential direction of the rotor core.

4. A method for manufacturing a rotor for a rotating electrical machine, the rotor including:
    a cylindrical and hollow rotor core having a plurality of laminated electromagnetic steel plates, wherein an inner peripheral surface and an outer peripheral surface of the rotor core are each adapted to face a magnetic gap, and the rotor core has an insertion hole;
    a first rotation support member having a first hole; and a second rotation support member having a second hole, wherein the first rotation support member and the second rotation support member are adapted to be located on opposite sides of the rotor core, wherein the method comprises:

inserting a tubular pin with a closed end into the first hole, the insertion hole, and the second hole, wherein the tubular pin has a first end at which a flange is formed; and plastically deforming the tubular pin through fluid pressure pressing to enlarge the size of the tubular pin, thereby causing the tubular pin to tightly contact inner peripheral surfaces of the insertion hole, the first hole, and the second hole.

5. The method according to claim 4, further comprising:

in inserting the tubular pin into the first hole, the insertion hole, and the second hole, inserting the tubular pin into the first hole and the insertion hole such that the tubular pin projects from the second hole; and in plastically deforming the tubular pin, increasing the diameter of the portion of the tubular pin projecting from the second hole.

\* \* \* \* \*